(12) United States Patent
Hanson

(10) Patent No.: US 10,641,464 B2
(45) Date of Patent: May 5, 2020

(54) LED LIGHT AND LIGHT SUPPORT

(71) Applicant: TouchStone Accent Lighting, Long Lake, MN (US)

(72) Inventor: Mark Hanson, Long Lake, MN (US)

(73) Assignee: TouchStone Accent Lighting, Long Lake, MN (US)

( * ) Notice: Subject to any disclaimer, the term of this patent is extended or adjusted under 35 U.S.C. 154(b) by 0 days.

(21) Appl. No.: 16/371,570

(22) Filed: Apr. 1, 2019

(65) Prior Publication Data
US 2019/0323686 A1     Oct. 24, 2019

Related U.S. Application Data

(60) Provisional application No. 62/661,409, filed on Apr. 23, 2018.

(51) Int. Cl.
| | |
|---|---|
| *F21V 15/01* | (2006.01) |
| *F21V 19/00* | (2006.01) |
| *H05B 33/08* | (2020.01) |
| *F21S 9/03* | (2006.01) |
| *H05B 45/20* | (2020.01) |

(52) U.S. Cl.
CPC .............. *F21V 15/01* (2013.01); *F21S 9/037* (2013.01); *F21V 19/003* (2013.01); *H05B 45/20* (2020.01)

(58) Field of Classification Search
CPC .... F21V 15/01; F21V 19/003; F21V 23/0464; F21V 21/0824; F21S 9/037; F21W 2131/109; F21Y 2115/10; F21Y 2113/13
See application file for complete search history.

(56) References Cited

U.S. PATENT DOCUMENTS

| | | | |
|---|---|---|---|
| 9,657,926 B2 * | 5/2017 | Steele | F21V 21/00 |
| 9,970,635 B2 * | 5/2018 | Rood | F21V 21/06 |
| 10,072,802 B1 * | 9/2018 | Boehm | H02S 40/38 |
| 2007/0183144 A1 * | 8/2007 | Van Ulmer | B44C 5/005 |
| | | | 362/184 |
| 2016/0025287 A1 * | 1/2016 | Philhower | F21S 9/037 |
| | | | 362/183 |
| 2019/0101265 A1 * | 4/2019 | Steele | F21V 13/10 |
| 2019/0331323 A1 * | 10/2019 | Richmond | F21V 17/007 |

* cited by examiner

*Primary Examiner* — Tracie Y Green
(74) *Attorney, Agent, or Firm* — Vidas, Arrett & Steinkraus, P.A.

(57) ABSTRACT

The invention includes an elongate riser, a circular base having a support arm, an interior wall, an exterior wall, and a coupler, the coupler being engaged to the riser, and a circular housing having an LED light source, a vertical wall, a bottom surface, and an upper surface, the upper surface has a lip extending outwardly from the vertical wall, the vertical wall being disposed interior to the interior wall, the bottom surface being disposed on the support arm, and the housing having a controller and at least one switch, and the controller regulates illumination being generated downwardly from the bottom surface. The housing being a modular drop in unit for removable engagement to the base.

19 Claims, 3 Drawing Sheets

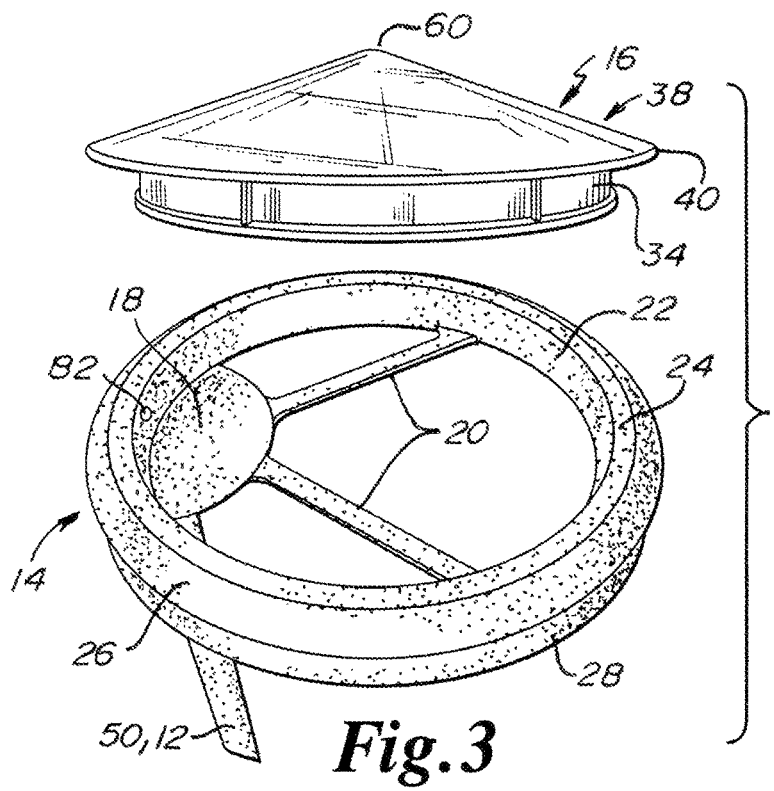
Fig.3
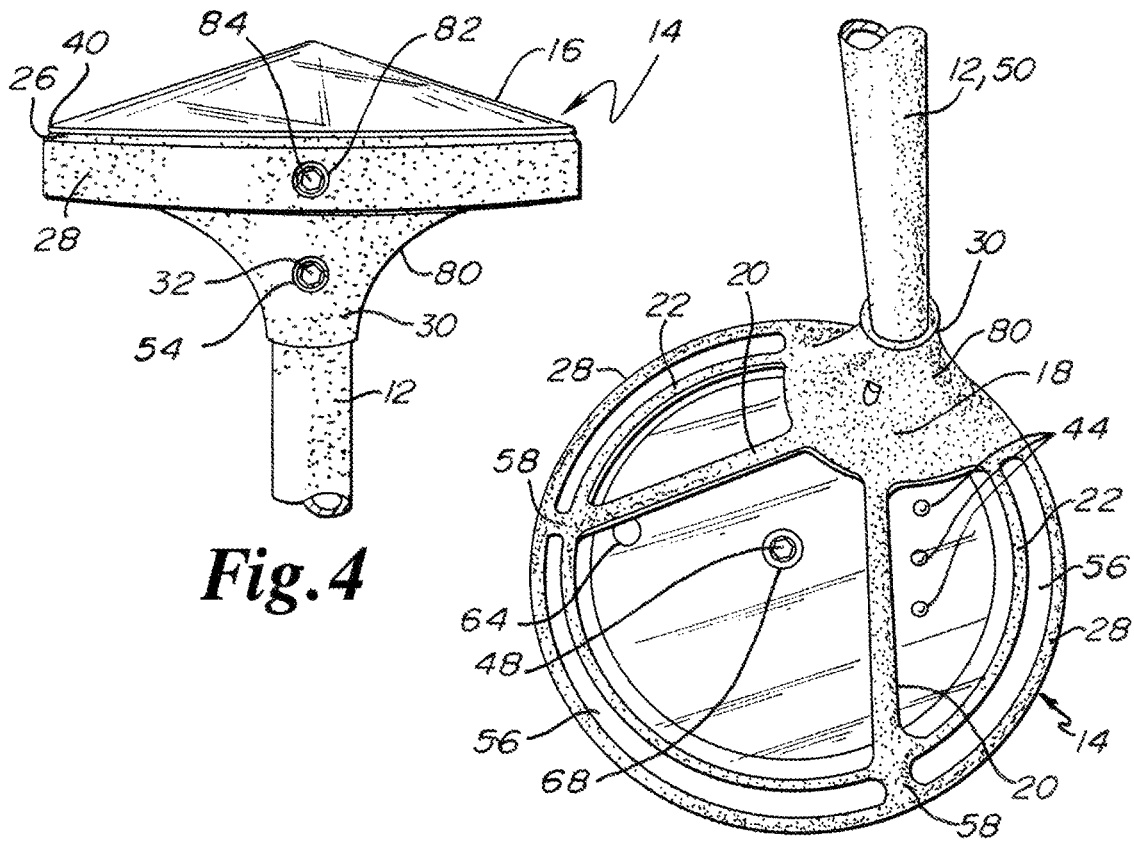
Fig.4
Fig.8

LED LIGHT AND LIGHT SUPPORT

CROSS-REFERENCE TO RELATED APPLICATIONS

This application claims the benefit of U.S. Provisional Patent Application Ser. No. 62/661,409 filed Apr. 23, 2018, which is incorporated by reference herein in its entirety.

FIELD OF THE INVENTION

In general this invention relates to a light emitting diode (LED) light and light support which is used to illuminate areas such as landscaping, plants, sidewalks, gardens, walkways, steps, pools, driveways, boulders, flowers, and/or shrubs.

BACKGROUND

In the past, solar cells and batteries have been used within lighting units to provide illumination within gardens and along pathways. The known lighting units frequently included a light sensor which would trigger the operation/engagement of conventional incandescent light sources, once a level of darkness or the absence of light had been detected by the sensor for a set period of time.

In the past, the lighting units frequently provided a short or limited useful life due to the degradation of the battery sources over time when exposed to daily recharge from the solar cells. In addition, the conventional light sources as known were inefficient, requiring a large amount of energy from the batteries in order to provide a desired level of illumination. The energy draw by the conventional light sources frequently depleted stored energy within the batteries in a few hours of time, resulting in the dimming and shut down of the known lighting units.

Also in the past, the known lighting units frequently failed to include a programmable timer to regulate the duration of time in which a lighting unit would provide illumination. To satisfy this need individuals frequently obtained light sources which were continuously activated and powered through a wired connection. In the known devices individuals would insert and external timer device at a desired location somewhere along the wired connection between the electrical source and the lighting unit.

The lighting units as known also were formed of one-piece integral construction where the components of the lighting units were not easily separated from the unit as a whole, rendering replacement problematic, which also limited the flexibility and usefulness of the lighting unit to an individual.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In at least one embodiment the light emitting diode light and light support includes an elongate riser having an end, a circular base, the base having at least one support arm, a base interior wall, an exterior base vertical wall, and a coupler, the coupler releasably receiving the end of the riser, the interior wall having a first diameter having a first dimension, the interior wall having a top support edge, and a circular housing, the housing having a light emitting diode (LED) light source, a housing vertical wall, a housing bottom surface, and a housing upper surface, the LED light source being in electrical communication with a power source, the housing upper surface having a lip extending outwardly from the housing vertical wall, the housing vertical wall having a second diameter, the second diameter having a smaller dimension than the first diameter, the housing vertical wall being disposed interior to the base interior wall, the housing bottom surface being disposed proximate to the at least one support arm, and the lip being disposed proximate to the top support edge, the housing further comprising a controller and at least one switch, wherein the riser supports the base and the housing above a surface and the LED light source generates illumination downwardly from the housing bottom surface where the housing is easily lifted for separation from the base.

In an alternative embodiment the base has a transition area and at least two support arms and the coupler is disposed adjacent to a perimeter of the base.

In another alternative embodiment the housing upper surface is conical in shape and the housing is transparent or translucent.

In another alternative embodiment the housing has a plurality of LED light sources and at least two of the plurality of LED light sources are of different colors.

In another alternative embodiment the controller activates the LED light sources to generate illumination of different colors.

In another alternative embodiment the controller has a timer function, an illumination emission mode, and/or an illumination pattern mode where any of the timer function, the illumination emission mode, and/or the illumination pattern mode may be used simultaneously, alternatively, in any desired sequence, and/or in any combination.

In another alternative embodiment the housing bottom surface has an activation aperture, a plurality of adjustment switch apertures, and a display aperture.

In another alternative embodiment the at least one switch is an on/off switch, and the on/off switch is in electrical communication with the controller.

In another alternative embodiment the housing has at least one battery, and the at least one battery is in electrical communication with the controller and the plurality of LED light sources.

In another alternative embodiment the housing also has a light sensor, the light sensor being in electrical communication with the controller.

In another alternative embodiment the housing additionally has at least one solar cells which is in electrical communication with the at least one battery.

In another alternative embodiment the housing has a plurality of adjustment switches which are in electrical communication with the controller and a display which is in electrical communication with the controller.

In another alternative embodiment the exterior base wall has a beveled upper edge and the housing is releasably engaged to the base and the base is releasably engaged to the riser.

In another alternative embodiment at least one of the plurality of LED light sources emits light downwardly through the housing lower surface and at least one of the plurality of LED light sources emits light upwardly through the housing upper surface.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 3 is a partial exploded isometric environmental view of one alternative embodiment of the LED light and light support;

FIG. 4 is a partial rear plan view of one alternative embodiment of the LED light and light support;

FIG. 8 is a bottom plan detail view of one alternative embodiment of the base.

DETAILED DESCRIPTION OF THE PREFERRED EMBODIMENTS

Figure 1:
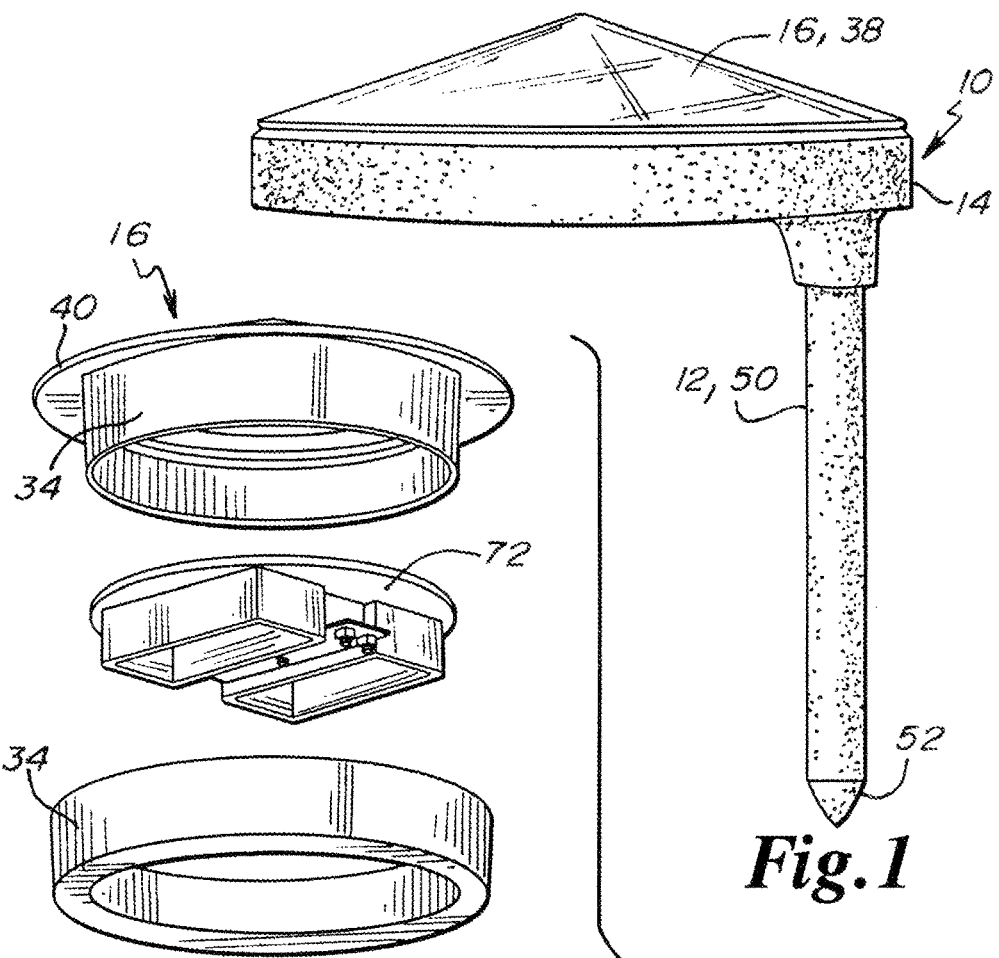
FIG. 1 is a side elevation view on one alternative embodiment of the LED light and light support.

In at least one alternative embodiment as shown in FIGS. 1 through 8, the light emitting diode (LED) light unit light support are generally referred to by reference numeral 10. The LED light unit 10 is generally formed of a riser 12, a base 14 and an LED light housing 16.

In at least one embodiment, the riser 12 is of tubular construction having a height dimension of between 18 inches and 32 inches. In some alternative embodiments, the height dimension for the riser 12 may be shorter than 18 inches and longer than 32 inches at the discretion of an individual.

In some embodiments, the riser 12 has a diameter dimension of approximately ⅝ inches measured at the outside diameter. Alternatively, the diameter dimension for the riser may be smaller than ⅝ inches or larger than ⅝ inches at the discretion of an individual.

In a preferred embodiment, the riser 12 is formed of metallic material, such as for example aluminum, copper, or stainless steel which is designed for use in outdoor weather environments/conditions which will not rust or corrode when repeatedly exposed to changing environmental conditions including but not limited to temperature, humidity and moisture exposure. In some embodiments, the riser 12 may be coated or painted to inhibit rust.

In an alternative embodiment, the riser 12 may be formed of plastic, carbon, fiber-glass, metal, composite materials and combinations thereof provided that the riser 12 is formed of a sturdy material which will not fracture or fail when vertically supporting a base 14 and LED light unit housing 16 in adverse environmental conditions.

In alternative embodiments, the riser 12 may be treated or painted to display any desired color or combination of colors to highlight, contrast, or to blend into a gardening environment or as disposed along a pathway or sidewalk.

In at least one embodiment, the riser 12 will include a tubular upper riser section 50 as well as a lower point 52 which may be inserted into the earth at any desired location to provide selected illumination to a desired area.

As may be seen in FIGS. 1 through 8 in at least one embodiment, the base 14 is substantially circular in shape. The base 14 may include an offset transition area 18 which is located proximate to the perimeter of the base 14. The base may also include a plurality of support arms 20, a base interior wall 22, and a vertical base exterior wall 28.

In at least one embodiment, the interior upper surface of the transition area 18 is a flat horizontal plane which is normal relative to the vertical plane established by the riser 12 during use of the LED light and light support 10. The interior upper surface of the transition area 18 preferably functions as a support surface for the LED light unit housing 16.

In at least one embodiment, the exterior lower surface of the transition area 18 includes an arcuate portion 80 which descends from the lower surface of the base interior wall 22 and exterior base vertical wall 28 forming the circular shaped coupler 30. The coupler 30 is preferably sized to receive the upper edge of the tubular upper riser section 50. The coupler 30 is also preferably disposed/positioned towards the perimeter of the base 14.

In at least one preferred embodiment, the coupler 30 will include a plurality of threaded apertures 54. The threaded apertures 54 are constructed to receive releasable affixation members 32 which in some embodiments may be set screws. In other embodiments, the affixation members may be flathead or Phillips head screws, bolts, or other mechanical fastening elements. The affixation members 32 preferably releasably secure the base 14 to the riser 12.

In at least one embodiment as depicted in FIG. 8, the underside of the base 14 is shown. The base 14 includes the circular exterior base vertical wall 28. Immediately interior to the exterior base vertical wall 28 is located a channel or gap 56. The channel or gap 56 is circular in shape and extends from one side of the lower surface of the transition area 18 to the opposite side of the lower surface of the transition area 18.

In some embodiments, the base 14 includes a circular base interior wall 22 which is located interior relative to the channel or gap 56. The base interior wall 22 preferably extends in a vertical direction and is substantially parallel to the exterior base vertical wall 28.

In at least one embodiment, a plurality of support bridges 58 extend between the inner surface of the exterior base vertical wall 28 and the outer surface of the base interior wall 22. The support bridges 58 may be integral, or releasably or permanently secured to the exterior base vertical wall 28 and the base interior wall 22.

In a preferred embodiment, a plurality of support arms 20 extend between the interior surface/edge of the base interior wall 22 and the transition area 18. The support arms 20 may be integral to both the base interior wall 22 and the transition area 18. Alternatively, the support arms 20 may be releasably or permanently secured to one or both of the transition area 18 and the base interior wall 22.

In at least one embodiment as depicted in FIG. 3, the upper edge of the base interior wall 22 includes an outwardly disposed horizontally extending top support edge 24. In addition, the upper edge of the exterior base vertical wall 28 includes an inwardly disposed beveled upper edge 26 which is integral to both the exterior base vertical wall 28 and the outer edge of the outwardly disposed top support edge 24.

In at least one embodiment, the upper surfaces of the exterior base vertical wall 28 the beveled upper edge 26, the top support edge 24 and the base interior wall 22 are integral to each other.

In some embodiments, the base 14 has an inner circumference dimension of approximately 5.6 inches. In other embodiments the inner circumference dimension for the base 14 may be less than 5.6 inches and larger than 5.6 inches at the preference of an individual.

In some embodiments, the base 14 has an outer circumference dimension of approximately 6.6 inches. In other embodiments the outer circumference dimension for the base 14 may be less than 6.6 inches and larger than 6.6 inches at the preference of an individual.

In at least one embodiment, the transition area 18 includes an arcuate exterior edge which may be a portion of a circle. The radius for the transition area 18 may be between 1½ inch and 3 inches. The radius for the transition area 18 may in some embodiments be less than 1½ inches and larger than 3 inches at the discretion of an individual.

In at least one embodiment, the support arms 20 have a length dimension of between 4 inches and 13 inches. In other embodiments, the length dimension of the support arms 20 may be smaller than 4 inches and larger than 13 inches at the discretion of an individual. In some embodiments, the support arms 20 have a width dimension of between ¼ inch and ¾ inches. In other embodiments, the support arms have a width dimension smaller than ¼ inch and larger than ¾ inches. In at least one embodiment, the support arms 20 have a thickness dimension of between ⅛ inch and ½ inch. In other embodiments, the thickness dimension of the support arms 20 may be less than ⅛ inch and larger than ½ inch at the preference of an individual.

In at least one embodiment, the base interior wall 22 has a height dimension of between ½ inch and 2 inches. In other embodiments the height dimension of the base interior wall 22 may be less than ½ inch and larger than 2 inches at the discretion of an individual. In some embodiments, the base interior wall 22 has a thickness dimension of between ⅜ inch and 1 inch. In other embodiments, the thickness dimension of the base wall 22 may be less than ⅜ inch and more than 1 inch at the preference of an individual.

In some embodiments the top support edge 24 has a width dimension between ¾ inch and ¾ inches. In some alternative embodiments, the top support edge 24 has a width dimension smaller than ¾ inch and larger than ¾ inches at the preference of an individual.

In at least one alternative embodiment the beveled upper edge 26 has a width dimension of between ⅜ inch and ⅞ inches. In at least one alternative embodiment, the beveled upper edge 26 has a width dimension smaller than ⅜ inch and larger than ⅞ inches.

In at least one embodiment, the exterior base vertical wall 28 is a height dimension of between ¾ inch and 1¾ inch. In some alternative embodiments, the exterior base vertical wall 28 has a height dimension smaller than ¾ inch and larger than 1¾ inches. In a preferred embodiment, the exterior base vertical wall 28 has the same thickness dimension as the base interior wall 22. In other embodiments, the exterior base vertical wall 28 will have a thickness dimension which is smaller or larger than the thickness dimension of the base interior wall 22.

In at least one embodiment the coupler 30 has a height dimension of between ½ inch and 2 inches. In other embodiments the coupler has a height dimension smaller than ½ inch or larger than 2 inches at the preference of an individual. In other embodiments, the coupler 30 has a diameter dimension of between ½ inch and 2 inches. Alternatively, the coupler may have a diameter dimension smaller than ½ inch and larger than 2 inches at the discretion of an individual.

In at least one embodiment, the channel or gap 56 has a width dimension of between ⅛ inch and ¾ inches. In alternative embodiments the width dimension of the gap 56 may be smaller than ⅛ inch and larger than ¾ inches.

In at least one embodiment, the support bridges 58 have a width dimension of between ⅛ inch and ¾ inches. In other embodiments the width dimension for the support bridges 58 may be smaller than ⅛ inch and larger than ¾ inches.

In at least one embodiment the base 14 is formed of metallic material which is designed for use in outdoor weather conditions/environments which will not rust or corrode when repeatedly exposed to changing temperature, humidity and moisture. In some embodiments the base 14 may be coated or painted to inhibit rust.

In alternative embodiments the base 14 may be formed of plastic, carbon, fiber-glass, composite materials and combinations thereof provided that the base 14 is formed of a sturdy material which will not fracture or fail when supporting an LED light unit housing 16 in adverse environmental conditions.

In some embodiments the base 14 may have the same colorings or markings as the riser 12. Alternatively, the colors or markings selected for the base 14 may contrast, complement, blend, or match the colors and/or markings of the riser 12. In some embodiments, the colors and/or markings selected for the riser 12 and/or base 14 will vary dependent on the color of illumination to be emitted from the LED light unit housing 16.

In at least one alternative embodiment, the transition area 18 may be centrally disposed relative to the base interior wall 22. In this embodiment, the support arms 20 will extend in a radial direction outwardly from the transition area 18 to the inner wall of the base interior wall 22.

In at least one embodiment, an LED light unit housing 16 is releasably positioned within the interior of the base interior wall 22 and rests at least partially upon the upper surface of the transition area 18 and the upper surface of the support arms 20.

As may be seen in FIGS. 1 through 8, the LED light unit housing 16 is circular in shape having a housing vertical wall 34. The LED light unit housing 16 also includes a housing bottom surface 36 as well as a housing upper surface 38. The housing bottom surface 38 is preferably horizontal. Housing upper surface 38 is preferably conical in shape. Alternatively, the LED light unit housing 16 and the base 14 may be square or any other sah[e as desired by an individual.

The LED light unit housing 16 is preferably formed of transparent or translucent glass or plastic material which permits light emitted from one or more LED's 48 to pass therethrough.

In at least one alternative embodiment, the housing upper surface 36 which has the shape of a cone is inverted, with the housing point 60 disposed upwardly. The housing upper surface 38 preferably has a larger diameter dimension as compared to the diameter dimension for the housing vertical wall 34. The extension of the housing upper surface 36 outwardly beyond the housing vertical wall 34 creates a circular lip 40 around the circumference of the housing vertical wall 34. (FIG. 6) In some embodiments, the bottom of the lip 40 may be horizontal or flat.

In a preferred embodiment, the diameter dimension for the housing vertical wall 34 is slightly less than the inner diameter for the base interior wall 22. During use, the housing vertical wall 34 is disposed adjacent to the base interior wall 34 and the lower surface of the lip 40 is disposed proximate to the top support edge 24.

The base 14 supports and elevates the LED light unit housing 16 a desired distance above a ground surface. In at least one embodiment, the LED light unit housing 16 is releasably held within the interior of the base interior wall 22 by gravity and may be easily separated therefrom by lifting of the LED light unit housing 16 vertically relative to the base 14. The convenient separation of the LED light unit housing 16 from the base 14 facilitates the substitution of an LED light unit housing 16, in order to change the color of emitted light, to replace batteries, to change operational modes, to name a few of the benefits afforded to an individual to separate the LED light unit housing 16 from the base 14.

In one alternative embodiment, the exterior base vertical wall 28 and the base interior wall 22 each include an aligned aperture 82. A fastener 84 may pass through the aligned apertures 82 in order to assert pressure against the exterior surface of the housing vertical wall 34 to releasably secure the LED light unit housing 16 within the base 14.

In at least one preferred embodiment, the LED light unit housing 16 is waterproof and/or moisture resistant, where the inverted conical shape of the housing upper surface 38 directs moisture downwardly and away from the LED light unit housing 16. In at least one embodiment, the housing upper surface 38 is an integral one piece unit, which diverts moisture outwardly and downwardly from the housing point 60 towards the outer edge of the lip 40.

Figure 2:
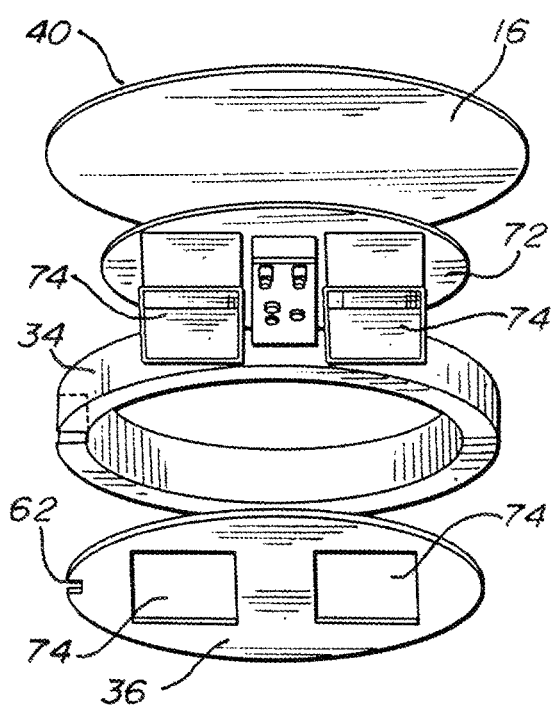
FIG. 2 is an exploded side elevation view on one alternative embodiment of the LED light unit housing.
Figure 5:
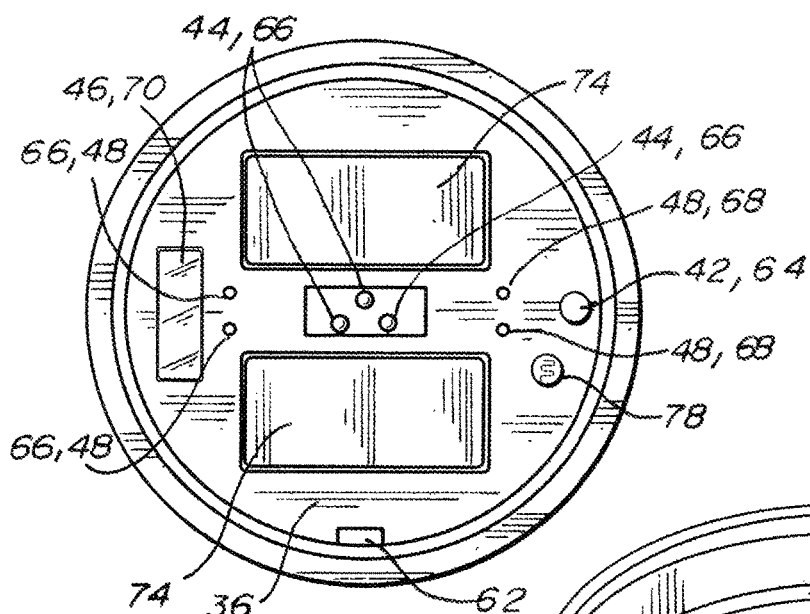
FIG. 5 is a bottom plan detail view of one alternative embodiment of the LED light unit housing.
Figure 6:
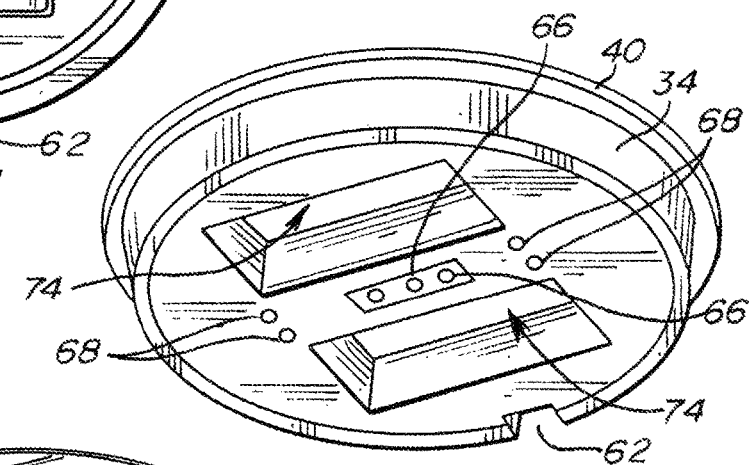
FIG. 6 is an isometric environmental detail view of one alternative embodiment of the LED light unit housing.
Figure 7:
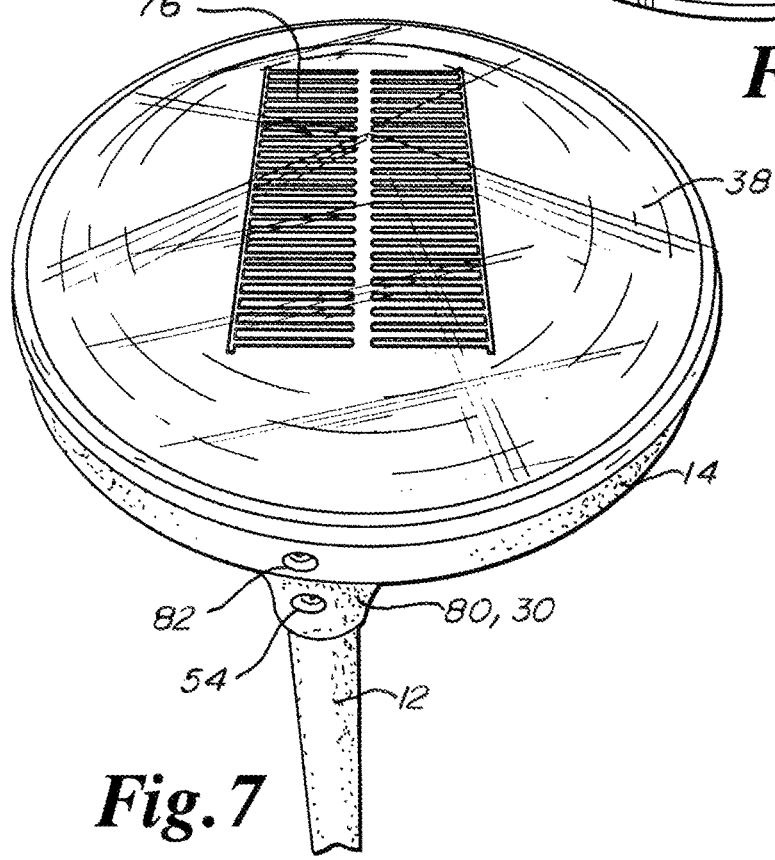
FIG. 7 is a partial top isometric environmental view of one alternative embodiment of the LED light and light support.

As may be seen in FIGS. 2, 5 and 6 the housing bottom surface 36 is circular in shape having a diameter substantially equal to the diameter of the housing vertical wall 34. In some embodiments, the housing bottom surface 36 may be releasably attached to the perimeter of the housing vertical wall 34 by the use of fasteners which may be screws. In alternative embodiments the upper interior surface of the housing bottom surface 36 may include either penetrating or receiving clips or notches 62 and the interior of the lower portion of the housing vertical wall 34 may include mating receiving clips or notches 62. Alternatively, the upper interior surface of the housing bottom surface 36 may include a threaded portion and the lower portion of the housing vertical wall 34 may include receiving threads to enable rotational and releasable engagement between the housing bottom surface 36 and the housing vertical wall 34.

In a preferred embodiment, the housing bottom surface 36 is releasably engaged to the housing vertical wall 34 in order to permit access to electrical components disposed within the interior of the LED light unit housing 16.

In at least one embodiment, the housing bottom surface 36 includes an activation aperture 64 which receives an on/off switch 42 which may be a button. The housing bottom surface 36 also includes a plurality of adjustments switch apertures 66, where each of the adjustment switch apertures 66 receives an adjustment switch 44.

In at least one alternative embodiment, the housing bottom surface 36 includes one or more LED apertures 68 each of which being aligned with an LED light source 48. In at least one alternative embodiment, the housing bottom surface 36 may include a display aperture 70 which is aligned with a display 46.

In at least one alternative embodiment, a circuit board/controller 72 is disposed within the interior of the LED light unit housing 16. Rechargeable or replaceable batteries are in electrical communication with the on/off switch 42, adjustable switches 44, display 46, LED's 48 and the circuit board/controller 72 to provide electrical power to the LED light and light support 10. The rechargeable or replaceable batteries are removably disposed within battery cavities 74 which are within the interior of the LED light unit housing 16.

In at least one embodiment, solar cells 76 are positioned within the interior of the LED light unit housing 16 and the solar cells 76 are in communication with the rechargeable batteries to replenish electricity expended during operation of the LED's 48. The transparent housing upper surface 38 enables sunlight to pass therethrough for receipt by the solar cells 76 as positioned proximate to the upper surface of the circuit board/controller 72.

In some alternative embodiments, the circuit board/controller 72 includes a timer function which may be used to regulate the activation or shutdown of the LED's 48. Prior to the operation of the timer function the on/off switch 42 is required to be activated. The adjustment switch 44 may be used to indicate a current time as identified on the display 46. The adjustment switch 44 may then be manipulated to enter the current time into memory integral to the circuit board/controller 72. Additional activation switches 44 may be actuated in order to access the timer function/mode as one or more of the pre-programmed operational modes for the circuit board/controller 72. The activation switches 44 may then be used to enter the start time for the initiation of illumination from the LED's 48 and the desired shutdown time for deactivation of the LED's 48. The start and stop time for illumination will be stored into memory integral to the circuit board/controller 72.

In at least one alternative embodiment, the circuit board/controller 72 will include an illumination emission mode. In this alternative embodiment, the activation switches 44 may toggle the display 46 to indicate for example mode "2" which has been assigned as the illumination emission mode. In this embodiment the circuit board/controller 72 will regulate power to be provided to the LED's 48 to implement an incremental increase in the intensity of provided illumination for a desired duration of time until a peak illumination occurs. The circuit board/controller 72 may then incrementally decrease the intensity of the illumination for a set period of time prior to extinguishing illumination.

In at least one alternative embodiment, the circuit board/controller 72 is in communication with a light sensor 78. Light sensor 78 signals the circuit board/controller 72 to activate the LED light sources 48 once an insufficient amount of light is detected over a set period of time by the light sensor 78. Sensor 78 will also signal the circuit board/controller 72 to deactivate the LED light sources 48 once a sufficient amount of light is detected for a set duration of time.

In at least one alternative embodiment, other operational modes, in addition to the operational modes identified herein, may be programmed into the circuit board/controller 72. The circuit board/controller 72 at the discretion of an individual may designate any specific operational mode with a mode or function number for communication on the display 46. The adjustments switchs 44 may be used to select a desired operational mode. In one example the adjustments switchs 44 may include an increasing switch, a decreasing switch and an enter switch. The circuit board/controller 72 may permit the adjustments switches 44 to only advance or reduce an entry by a single integer, or alternatively may enable and adjustment switches 44 to be manipulated and held in an operative position to advance or reduce integers at set intervals or consecutively.

In at least one embodiment, the LED's 48 may be provided in a single or plurality of colors including but not limited to red, green, and blue and combinations thereof. In some embodiments, the circuit board/controller 72 through the adjustment switches 44 enables an individual to select the color of light to be emitted by individual light sources 48.

In at least one alternative embodiment, the circuit board/controller 72 is in communication with LED light sources 48 which will emit light in a downward direction through the housing bottom surface 36. Alternatively, the LED light sources 48 may emit light in an upward direction through the housing upper surface 38. Further, the circuit board/controller 72 may regulate the emission of light downwardly and upwardly simultaneously or at alternative intervals or in a desired illumination sequence or pattern including the illumination of different colors or combinations of colors of light.

In at least one embodiment the LED light unit housing 16 may have a diameter dimension of between 4 inches and 10 inches. Alternatively the diameter dimension for the LED light unit housing 16 may be smaller than 4 inches and larger than 10 inches.

In some embodiments the LED light unit housing 16 includes one solar cell 76 which may be 5 v, 120 mAh. The solar cell 76 may be used in conjunction with four 3.7 volt 800 mAh Li-ion 14500 button top batteries.

In another alternative embodiment the adjustment switches may include a master on/off switch, which may control a timer function of turning off the emission of light from the LED's 48 or for illumination of the LED's for either 2, 4, 6, or 8 hour intervals. The main adjustment switch 44 may also initiate a combination illumination mode where the LED's 48 are set for 2 hours at high; 2 hours at medium and 2 hours at a low illumination setting. A second adjustment switch 44 may be used to select illumination intensity options of for example 100%, 70% or 50% light intensity. A third adjustment switch 44 may activate a test mode where light is emitted from the LED's 48 for 30 seconds and then shuts off.

In at least one embodiment the LED light unit housing 16 is formed of polycarbonate material and the battery compartment 74 is made from ABS material. In the preferred embodiment the LED light unit housing 16 is a modular drop in unit for placement into a metal housing ring of the base 14. In some embodiments the ring may be circular, oval or square and the top of the LED light unit housing 16 may be pointed or
Rounded in Shape at the Discretion of an Individual.

In a first alternative embodiment the light emitting diode light and light support has an elongate riser having an end, a circular base, the base having at least one support arm, a base interior wall, an exterior base vertical wall, and a coupler, the coupler releasably receiving the end of the riser, the interior wall having a first diameter having a first dimension, the interior wall having a top support edge, and a circular housing, the housing having an light emitting diode (LED) light source, a housing vertical wall, a housing bottom surface, and a housing upper surface, the LED light source being in electrical communication with a power source, the housing upper surface having a lip extending outwardly from the housing vertical wall, the housing vertical wall having a second diameter, the second diameter having a smaller dimension than the first diameter, the housing vertical wall being removably disposed interior to the base interior wall, the housing bottom surface being disposed proximate to the at least one support arm, and the lip being disposed proximate to the top support edge, the housing further comprising a controller and at least one switch, wherein the riser supports the base and the housing above a surface and the LED light source generates illumination downwardly from the housing bottom surface.

In a second alternative embodiment according to the first alternative embodiment, the base has a transition area and at least two support arms.

In a third alternative embodiment according to the second alternative embodiment, the coupler is disposed adjacent to a perimeter of the base.

In a fourth alternative embodiment according to the third alternative embodiment, the housing upper surface is conical in shape.

In a fifth alternative embodiment according to the fourth alternative embodiment, the housing is transparent or translucent.

In a sixth alternative embodiment according to the fifth alternative embodiment, the housing has a plurality of LED light sources.

In a seventh alternative embodiment according to the sixth alternative embodiment, at least two of the plurality of LED light sources are of different colors.

In an eighth alternative embodiment according to the seventh alternative embodiment, the controller activates the LED light sources to generate illumination of different colors.

In a ninth alternative embodiment according to the eighth alternative embodiment, the controller has a timer function.

In a tenth alternative embodiment according to the ninth alternative embodiment, the controller has an illumination emission mode.

In an eleventh alternative embodiment according to the tenth alternative embodiment, the controller has an illumination pattern mode.

In a twelfth alternative embodiment according to the eleventh alternative embodiment, the controller has a timer function, an illumination emission mode, and/or an illumination pattern mode where any of the timer function, the illumination emission mode, and/or the illumination pattern mode may be used simultaneously, alternatively, in any desired sequence, and/or in any combination.

In a thirteenth alternative embodiment according to the eleventh alternative embodiment, the housing bottom surface has an activation aperture, a plurality of adjustment switch apertures, and a display aperture.

In a fourteenth alternative embodiment according to the eleventh alternative embodiment, the at least one switch is an on/off switch, and the on/off switch is in electrical communication with the controller.

In a fifteenth alternative embodiment according to the eleventh alternative embodiment, the housing further comprises at least one battery, the at least one battery being disposed in a battery compartment, the batteries being in electrical communication with the controller and the plurality of LED light sources.

In a sixteenth alternative embodiment according to the eleventh alternative embodiment, the housing further comprising a light sensor, the light sensor being in electrical communication with the controller.

In a seventeenth alternative embodiment according to the fourteenth alternative embodiment, the housing further comprising a plurality of solar cells in electrical communication with the at least one battery.

In an eighteenth alternative embodiment according to the eleventh alternative embodiment, the housing further comprises a plurality of adjustment switches in electrical communication with the controller and a display in electrical communication with the controller.

In a nineteenth alternative embodiment according to the eleventh alternative embodiment, the exterior base wall has a beveled upper edge and wherein the housing is releasably engaged to the base and the base is releasably engaged to the riser.

In a twentieth alternative embodiment according to the eleventh alternative embodiment, at least one of the plurality of LED light sources emits light downwardly through the lower housing surface and at least one of the plurality of LED light sources emits light upwardly through the housing upper surface.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. An light emitting diode light and light support comprising:
    an elongate riser having an end;
    a circular base, said base having at least one support arm, a base interior wall, an exterior base vertical wall, and a coupler, said coupler releasably receiving said end of said riser, said interior wall having a first diameter having a first dimension, said interior wall having a top support edge; and
    a circular housing, said housing having an light emitting diode (LED) light source, a housing vertical wall, a housing bottom surface, and a housing upper surface, said LED light source being in electrical communication with a power source, said housing upper surface having a lip extending outwardly from said housing vertical wall, said housing vertical wall having a second diameter, said second diameter having a smaller dimension than said first diameter, said housing vertical wall being removably disposed interior to said base interior wall, said housing bottom surface being disposed proximate to said at least one support arm, and said lip being disposed proximate to said top support edge, said housing further comprising a controller and at least one switch, wherein said riser supports said base and said housing above a surface and said LED light source generates illumination downwardly from said housing bottom surface.

2. The light emitting diode light and light support according to claim 1, said base having a transition area and at least two support arms.

3. The light emitting diode light and light support according to claim 2, said coupler being disposed adjacent to a perimeter of said base.

4. The light emitting diode light and light support according to claim 3, said housing upper surface being conical in shape.

5. The light emitting diode light and light support according to claim 4, said housing being transparent or translucent.

6. The light emitting diode light and light support according to claim 5, said housing having a plurality of LED light sources.

7. The light emitting diode light and light support according to claim 6, at least two of said plurality of said LED light sources being of different colors.

8. The light emitting diode light and light support according to claim 7, said controller activating said LED light sources to generate illumination of different colors.

9. The light emitting diode light and light support according to claim 8, said controller having a timer function.

10. The light emitting diode light and light support according to claim 9, said controller having an illumination emission mode.

11. The light emitting diode light and light support according to claim 10, said controller having an illumination pattern mode.

12. The light emitting diode light and light support according to claim 11, said housing bottom surface having an activation aperture, a plurality of adjustment switch apertures, and a display aperture.

13. The light emitting diode light and light support according to claim 11, wherein said at least one switch is an on/off switch, said on/off switch being in electrical communication with said controller.

14. The light emitting diode light and light support according to claim 11, said housing further comprising at least one battery, said at least one battery being in electrical communication with said controller and said plurality of LED light sources.

15. The light emitting diode light and light support according to claim 11, said housing further comprising a light sensor, said light sensor being in electrical communication with said controller.

16. The light emitting diode light and light support according to claim 14, said housing further comprising a plurality of solar cells in electrical communication with said at least one battery.

17. The light emitting diode light and light support according to claim 11, said housing further comprising a plurality of adjustment switches in electrical communication with said controller and a display in electrical communication with said controller.

18. The light emitting diode light and light support according to claim 11, said exterior base wall having a beveled upper edge and wherein said housing is releasably engaged to said base and said base is releasably engaged to said riser.

19. The light emitting diode light and light support according to claim 11, wherein at least one of said plurality of LED light sources emits light upwardly through said housing upper surface and at least one of said plurality of LED light sources emits light downwardly through said housing bottom surface.

* * * * *